(12) United States Patent
Yano et al.

(10) Patent No.: US 11,640,674 B2
(45) Date of Patent: May 2, 2023

(54) INFORMATION PROCESSING DEVICE, INFORMATION PROCESSING METHOD, AND STORAGE MEDIUM STORING INFORMATION PROCESSING PROGRAM

(71) Applicant: TOYOTA JIDOSHA KABUSHIKI KAISHA, Toyota (JP)

(72) Inventors: Masao Yano, Sunto-gun (JP); Tetsuya Shoji, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 56 days.

(21) Appl. No.: 17/365,290

(22) Filed: Jul. 1, 2021

(65) Prior Publication Data
US 2022/0012906 A1 Jan. 13, 2022

(30) Foreign Application Priority Data
Jul. 10, 2020 (JP) .............................. JP2020-119514

(51) Int. Cl.
*G06T 7/60* (2017.01)
(52) U.S. Cl.
CPC ...... *G06T 7/60* (2013.01); *G06T 2207/10056* (2013.01); *G06T 2207/30136* (2013.01)
(58) Field of Classification Search
CPC ...... H04N 1/4051; H04N 1/4015; G03G 5/04; G06T 2207/20056; G06T 2207/10056; G06T 7/0004; G06T 7/60; G06T 2207/30136; G06T 2207/20076; G06T 7/11; G06T 7/168; G06T 7/62; G06T 7/90; G06K 9/623; G06K 9/6245; G06K 9/6277; G06K 9/6298; G06K 15/00; G06K 15/027
See application file for complete search history.

(56) References Cited

U.S. PATENT DOCUMENTS

2018/0259441 A1* 9/2018 Johnson ................. G01N 15/06
2019/0287241 A1* 9/2019 Hill ...................... A61B 6/5282

FOREIGN PATENT DOCUMENTS

JP 2006126061 A * 5/2006

OTHER PUBLICATIONS

Improved Inversion of Scanning Electrical Mobility Spectrometer Data Using a New Multiscale Expectation Maximization Algorithm by Dubey et al (Year: 2006).*
Jis G0551:2013 "Steels—Micrographic determination of the apparent grain size" of Japan Industrial Standards, 52 pages (with partial English Translation).

(Continued)

*Primary Examiner* — Quan M Hua
(74) *Attorney, Agent, or Firm* — Oblon, McClelland, Maier & Neustadt, L.L.P.

(57) ABSTRACT

An information processing device acquires a material formation image representing a formation of a material, the material formation image being obtained by imaging the material. The information processing device generates a Fourier transform result representing a power spectrum by applying a Fourier transform to the acquired material formation image. The information processing device, on the basis of the Fourier transform result of the material formation image, employs an expectation-maximization algorithm to generate a size distribution of structures forming the material.

3 Claims, 11 Drawing Sheets

(56) References Cited

OTHER PUBLICATIONS

S. Koizumi, S. Ueda, Y. Nishikawa, T. Terao and N. Kubo, "New attempt to combine scanning electron microscopy and small-angle scattering in reciprocal space", J. Appl. Cryst. (2019) 52, 9 pages.

* cited by examiner

INFORMATION PROCESSING DEVICE, INFORMATION PROCESSING METHOD, AND STORAGE MEDIUM STORING INFORMATION PROCESSING PROGRAM

CROSS-REFERENCE TO RELATED APPLICATION

This application is based on and claims priority under 35 USC 119 from Japanese Patent Application No. 2020-119514 filed on Jul. 10, 2020, the disclosure of which is incorporated by reference herein.

BACKGROUND

Technical Field

The present disclosure relates to an information processing device, an information processing method, and a storage medium storing an information processing program.

Related Art

Heretofore, microscope examination processes for crystal grain sizes in steel have been known. For example, a process disclosed in JIS G0551:2013 "Steels—Micrographic determination of the apparent grain size" of Japan Industrial Standards measures the size of crystal grains at a polished surface of a test piece treated by appropriate processing, according to the kind of steel and other information, with a microscope.

When a formation image of a material obtained by a microscope as disclosed in the Reference mentioned above is used for detecting the sizes of structures forming the material shown in the image, large amounts of time and labor are required. Therefore, this conventional technology may not obtain a size distribution of the structures forming a material efficiently.

SUMMARY

In consideration of the circumstances described above, the present disclosure provides an information processing device, an information processing method, and a storage medium storing an information processing program that may efficiently obtain a size distribution of structures forming a material from a formation image of the material.

An information processing device according to a first aspect includes: an acquisition section that acquires a material formation image representing a formation of a material, the material formation image being obtained by imaging the material; and a distribution generation section that generates a Fourier transform result representing a power spectrum by applying a Fourier transform to the material formation image obtained by the acquisition section and, on the basis of the Fourier transform result of the material formation image, employs an expectation-maximization algorithm to generate a size distribution of structures forming the material.

The information processing device acquires the material formation image representing the formation of the material that is obtained by imaging the material. Then, by applying a Fourier transform to the material formation image, the information processing device generates a Fourier transform result representing a power spectrum. On the basis of the Fourier transform result of the material formation image, the information processing device employs the expectation-maximization (EM) algorithm to generate a size distribution of the structures forming the material. Thus, a size distribution of structures forming the material may be efficiently obtained from the formation image of the material.

An information processing device according to a second aspect further includes an image generation section that, on the basis of the material formation image acquired by the acquisition section, generates contrast images comprising a plurality of material formation images with different level of contrasts, wherein the distribution generation section generates a Fourier transform result for each of the plurality of contrast images generated by the image generation section and, on the basis of the respective Fourier transform results of the plural contrast images, employs the expectation-maximization algorithm to generate the size distribution of the structures forming the material.

In an information processing method according to a third aspect, a computer executes processing including: acquiring a material formation image representing a formation of a material, the material formation image being obtained by imaging the material; generating a Fourier transform result representing a power spectrum by applying a Fourier transform to the acquired material formation image; and, on the basis of the Fourier transform result of the material formation image, employing an expectation-maximization algorithm to generate a size distribution of structures forming the material.

A storage medium storing an information processing program according to a fourth aspect stores an information processing program that causes a computer to execute processing including: acquiring a material formation image representing a formation of a material, the material formation image being obtained by imaging the material; generating a Fourier transform result representing a power spectrum by applying a Fourier transform to the acquired material formation image; and, on the basis of the Fourier transform result of the material formation image, employing an expectation-maximization algorithm to generate a size distribution of structures forming the material.

According to the present disclosure as described above, an effect is provided in that a size distribution of structures forming a material may be obtained from a formation image of the material efficiently.

DESCRIPTION OF EMBODIMENTS

First Exemplary Embodiment

Below, an information processing device according to a first exemplary embodiment is described using the drawings.

Figure 1:
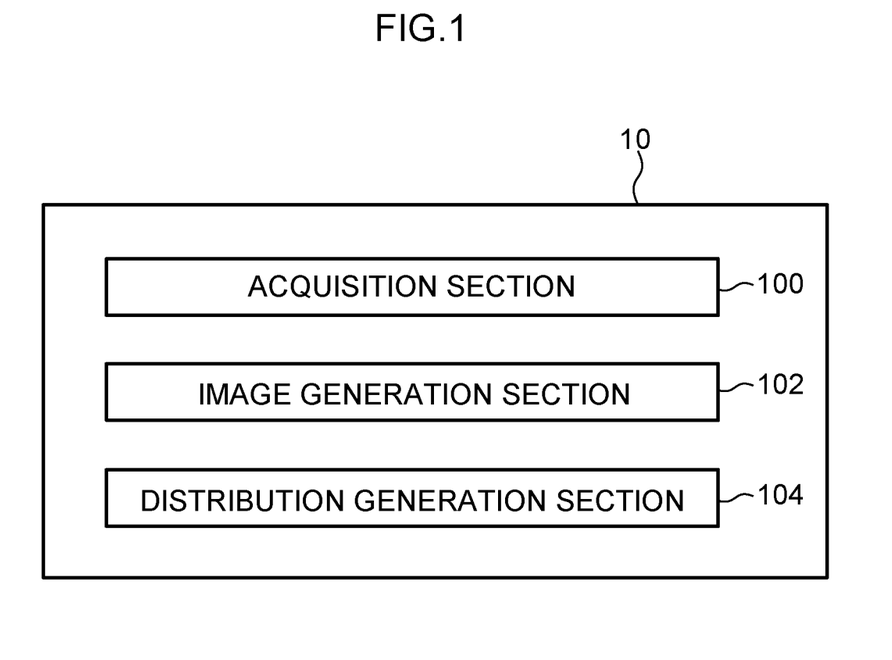
FIG. 1 is a schematic block diagram of an information processing device according to a first exemplary embodiment.

FIG. 1 is a block diagram showing an example of functional structures of an information processing device 10 according to the first exemplary embodiment. Functionally, as shown in FIG. 1, the information processing device 10 is provided with an acquisition section 100, an image generation section 102 and a distribution generation section 104.

The acquisition section 100 acquires a material formation image, which is an image that is captured when a material is observed using a microscope. The material formation image is an image depicting formations of the material, and is a grayscale image.

On the basis of the material formation image acquired by the acquisition section 100, the image generation section 102 generates contrast images, which are plural material formation images with different levels of contrasts.

Figure 2:
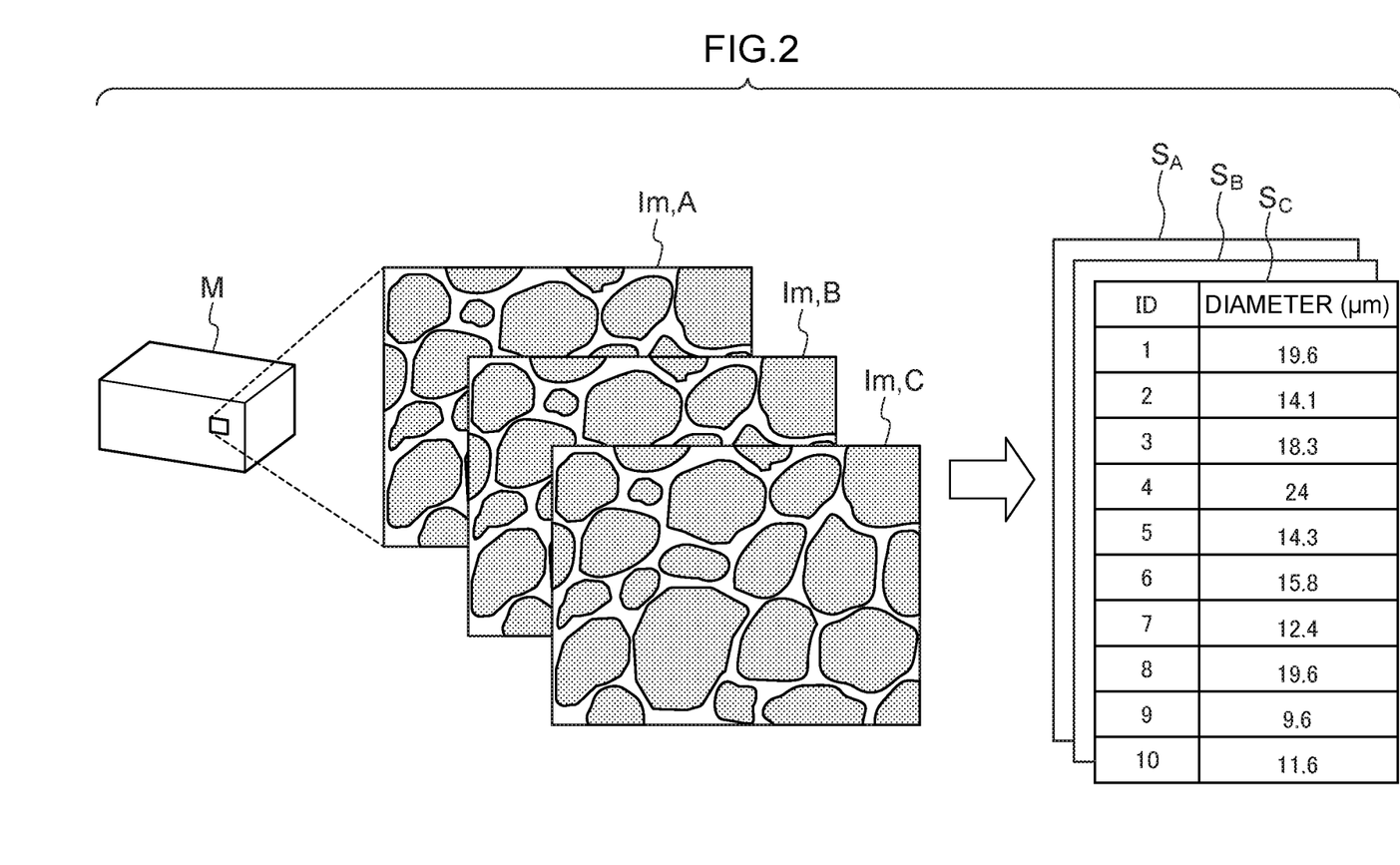
FIG. 2 is a diagram describing schematics of the first exemplary embodiment.
Figure 3:
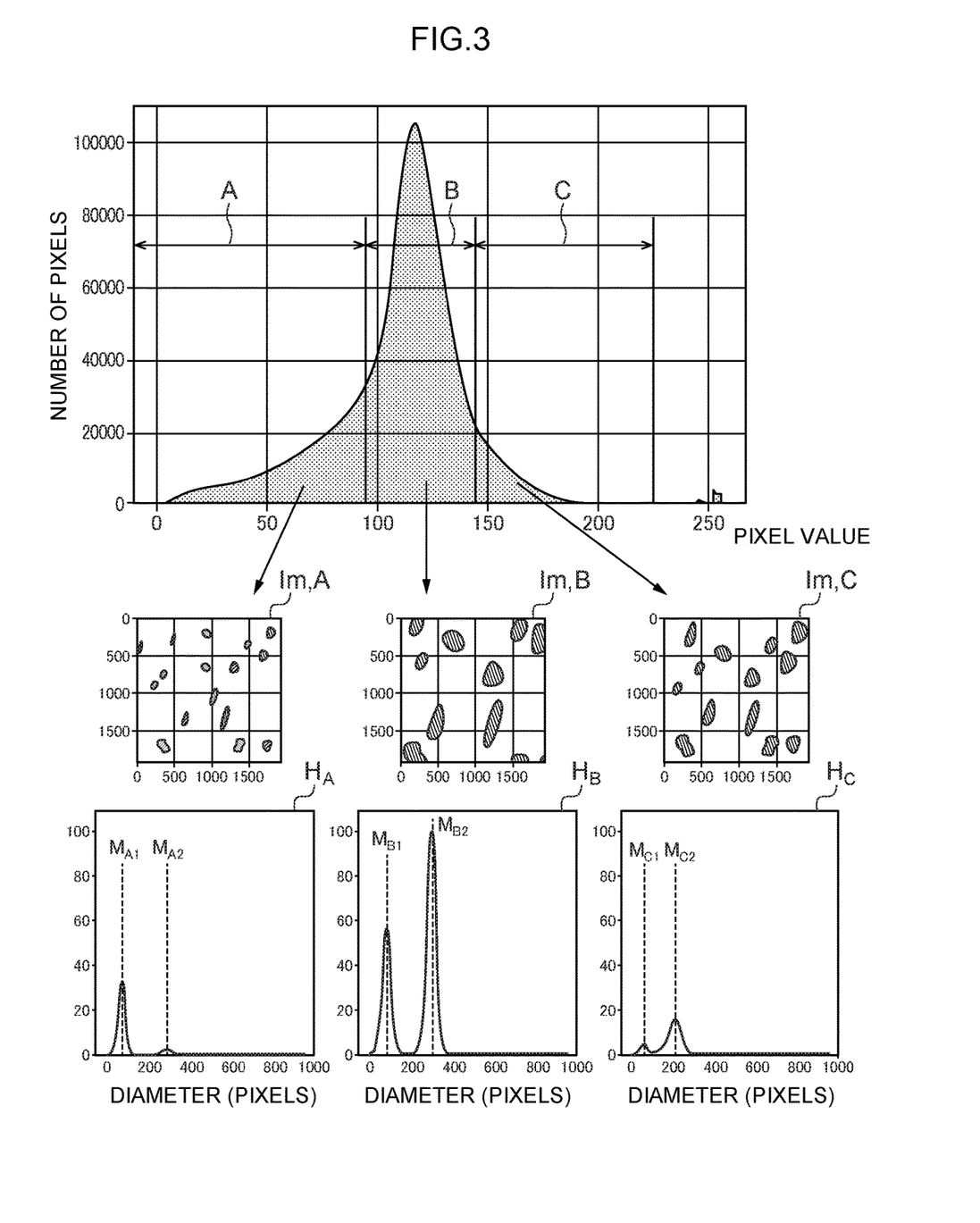
FIG. 3 is a diagram describing schematics of the first exemplary embodiment.

FIG. 2 and FIG. 3 are diagrams for describing schematics of the information processing device 10 according to the first exemplary embodiment. As shown in FIG. 2, from a material formation image of a material M that is obtained by a microscope, the information processing device 10 according to the first exemplary embodiment generates contrast images $I_{m,A}$, $I_{m,B}$ and $I_{m,C}$ that are shaded in accordance with different levels of contrasts. Structures of different sizes appear in each of the plural contrast images $I_{m,A}$, $I_{m,B}$ and $I_{m,C}$. The material is formed of plural structures. For example, the structures are grains, needles, fibers, holes or the like forming the material.

Hence, the information processing device 10 according to the first exemplary embodiment estimates sizes of the structures appearing in each of the plural contrast images $I_{m,A}$, $I_{m,B}$ and $I_{m,C}$ and generates size distributions $S_A$, $S_B$ and $S_C$ as illustrated in FIG. 2. The size distribution $S_A$ is generated from the contrast image $I_{m,A}$, the size distribution $S_B$ is generated from the contrast image $I_{m,B}$, and the size distribution $S_C$ is generated from the contrast image $I_{m,C}$. These size distributions may be calculated both for sizes in a horizontal direction and for sizes in a vertical direction of the structures appearing in the contrast images.

FIG. 3 is diagrams for describing schematics of the information processing device 10 according to the first exemplary embodiment in more detail. As shown in FIG. 3, when a pixel value distribution of a certain material formation image (the topmost image in FIG. 3) is divided up into different levels of contrasts, the plural contrast images $I_{m,A}$, $I_{m,B}$ and $I_{m,C}$ as illustrated in FIG. 3 are generated. The contrast image $I_{m,A}$ is a contrast image corresponding to region A in the pixel value distribution, the contrast image $I_{m,B}$ is a contrast image corresponding to region B in the pixel value distribution, and the contrast image $I_{m,C}$ is a contrast image corresponding to region C in the pixel value distribution. The information processing device 10 generates size distributions $H_A$, $H_B$ and $H_C$ corresponding to, respectively, the plural contrast images $I_{m,A}$, $I_{m,B}$ and $I_{m,C}$. In the size distributions $H_A$, $H_B$ and $H_C$, the peaks $M_{A1}$, $M_{A2}$, $M_{B1}$, $M_{B2}$, $M_{C1}$ and $M_{C2}$, are peaks of the size distributions, which may be computed by previously known techniques.

For each of the plural contrast images generated by the image generation section 102, the distribution generation section 104 estimates sizes of the structures forming the material that appear in that contrast image. On the basis of the estimated sizes of the structures, the distribution generation section 104 generates a size distribution of structures forming the material.

Specifically, by applying a Fourier transform to each of the plural contrast images generated by the image generation section 102, the distribution generation section 104 obtains a Fourier transform result representing a power spectrum. Then, on the basis of the Fourier transform result corresponding to each of the plural contrast images, the distribution generation section 104 employs a previously known expectation-maximization (EM) algorithm to generate the size distribution of the structures forming the material.

Figure 4:
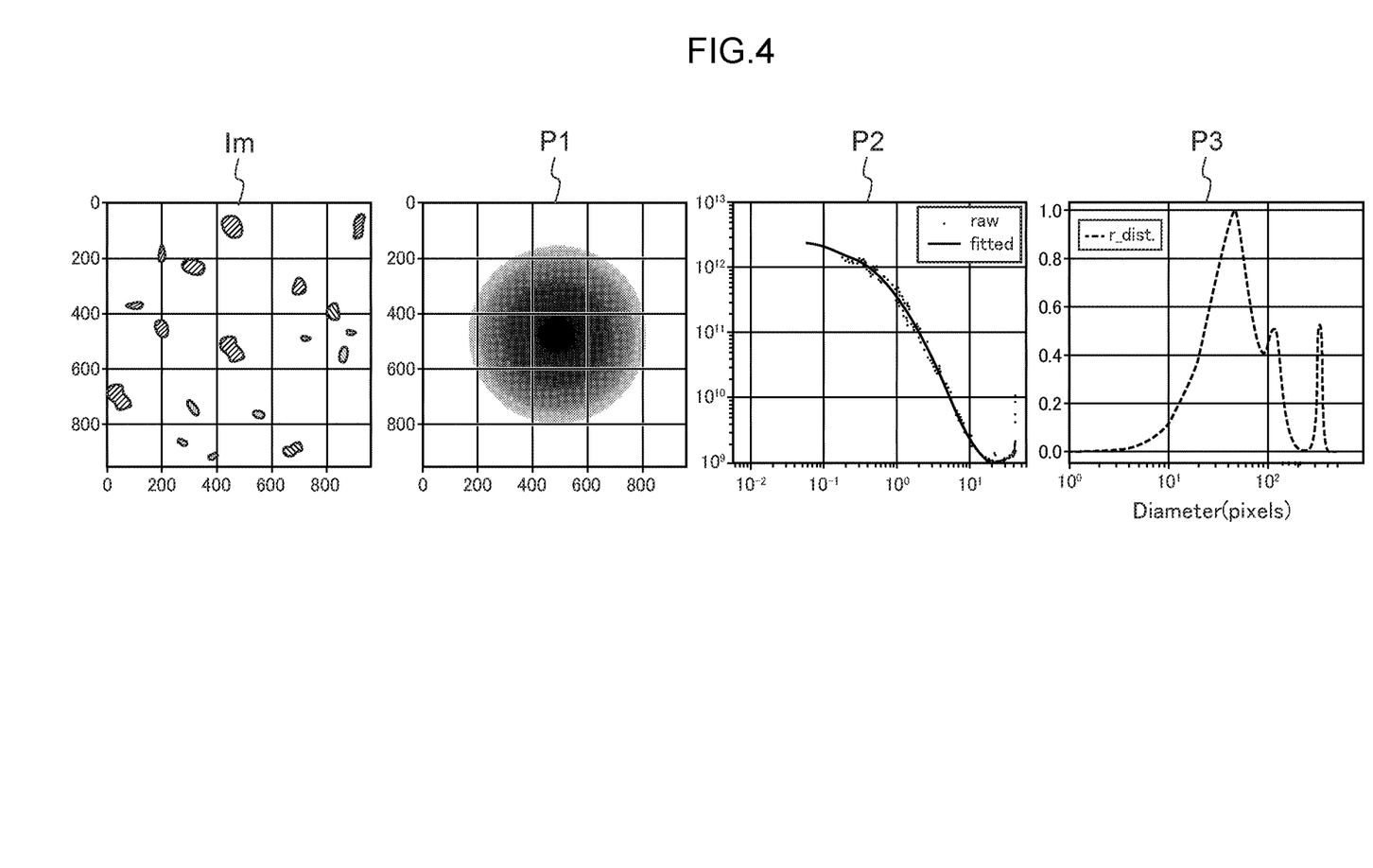
FIG. 4 is a diagram describing estimation of a size distribution on the basis of a Fourier transform result.

FIG. 4 is diagrams for describing a Fourier transform result of a contrast image and estimation of a size distribution. As shown in FIG. 4, the distribution generation section 104 applies a previously known Fourier transform to one contrast image Im obtained from the material formation image, and obtains a two-dimensional Fourier transform result P1.

The horizontal and vertical axes of the two-dimensional Fourier transform result P1 represent frequencies. Pixel values in the two-dimensional Fourier transform result P1 represent intensities of the frequencies. A graph P2 shown in FIG. 4 is a distribution of pixel values in a cross section of the two-dimensional Fourier transform result P1 shown in FIG. 4. The vertical axis of the graph P2 represents the pixel values corresponding to the intensities of the frequencies, and the horizontal axis represents the frequencies. The points labeled "raw" in the graph P2 represent the actual distribution of pixel values, and the plot labeled "fitted" is a curve fitted by a previously known technique to the distribution of pixel values.

A size distribution P3 is generated from the graph P2. In the size distribution P3 shown in FIG. 4, "r_dist" represents the size distribution of the structures.

More specifically, the distribution generation section 104 uses a technique disclosed in Japanese Patent Application No. 2019-085277 to generate the size distribution of the structures forming the material on the basis of the Fourier transform result of the contrast image.

This is described in specific terms below.

Figure 5:
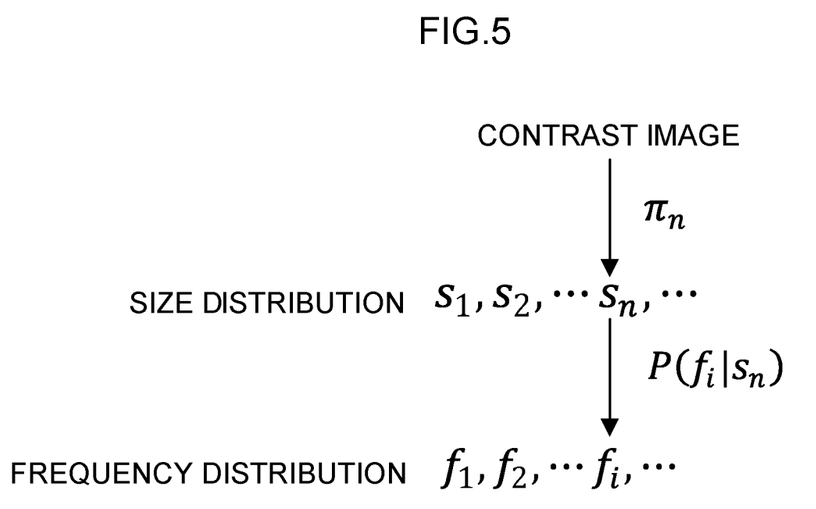
FIG. 5 is a diagram describing estimation of a size distribution by an EM algorithm.

FIG. 5 is a diagram schematically showing an estimation method of a size distribution of structures appearing in a contrast image. As shown in FIG. 5, a size of structures appearing in the contrast image is selected as a size $s_n$ corresponding to a selection probability $\pi_n$. If a probability that the size $s_n$ corresponds to a frequency $f_i$ is $P(f_i|s_n)$, the probability $P(f_i|s_n)$ is expressed by $I(s,f)$ in the following expression.

$$I(s, f) = \left( \frac{\sin fs}{f^3} - \frac{s \cos fs}{f^2} \right)^2 \quad (1)$$

$$P(f_i | s_m) = \frac{I(f_i | s_m)}{\sum_n I(f_i | s_n)}$$

In Bayesian statistics, $P(f_i|s_n)$ may be regarded as a posterior probability for which $s_n$ is the prior condition.

Given this assumption, a probability $P(f_i)$ of a frequency $f_i$ appearing may be calculated as the sum of the probabilities $P(f_i|s_n)$ for all the structures.

Figure 6:
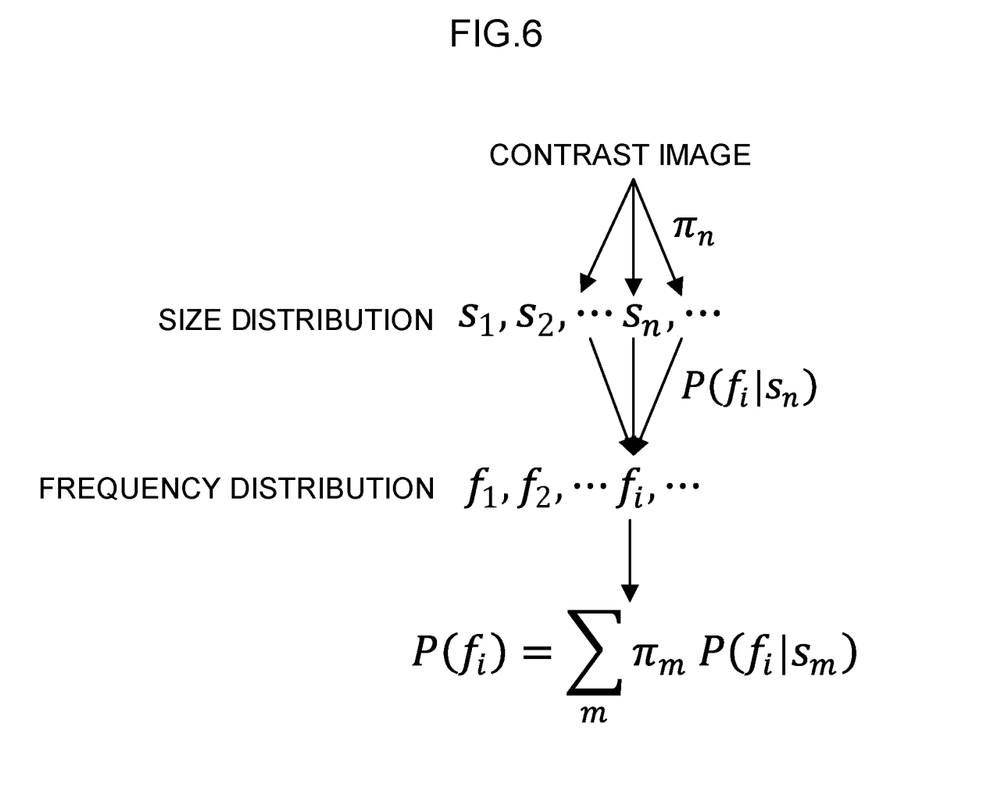
FIG. 6 is a diagram describing estimation of a size distribution by the EM algorithm.

FIG. 6 is a diagram for describing the probability $P(f_i)$ of the frequency $f_i$ appearing. As shown in FIG. 6, the probability $P(f_i)$ of the frequency $f_i$ appearing is a sum of probabilities $P(f_i|s_m)$, of sizes $s_m$ corresponding to the frequency $f_i$, weighted by selection probabilities $\pi_m$ thereof. The probability $P(f_i)$ is expressed by the following expression.

$$P(f_i) = \sum_m \pi_m P(f_i | s_m) \quad (2)$$

Figure 7:
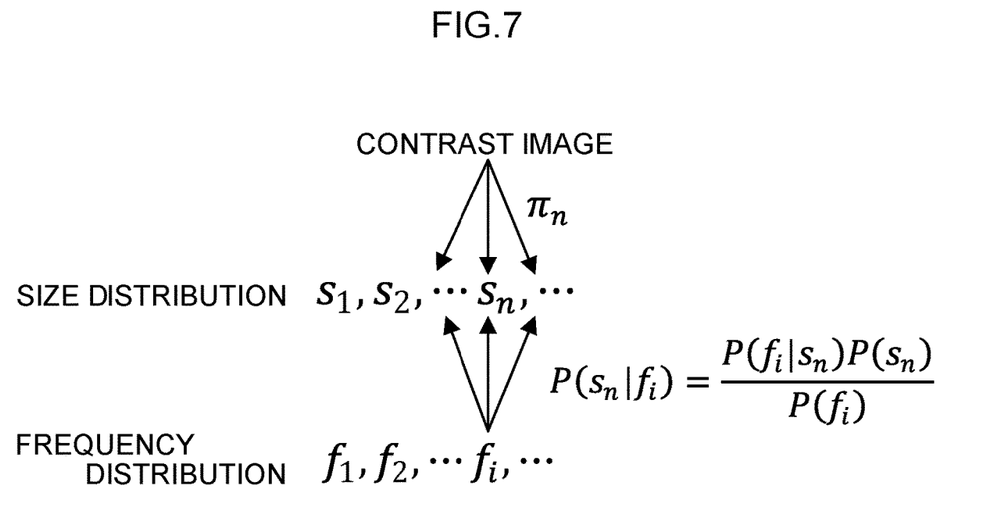
FIG. 7 is a diagram describing estimation of a size distribution by the EM algorithm.

FIG. 7 is a diagram for describing a method of finding selection probabilities from a frequency distribution. As shown in FIG. 7, a probability of a structure that corresponds to a frequency $f_i$ in the Fourier transform result corresponding to a size $s_n$ is denoted $P(s_n|f_i)$. Employing the previously known Bayes' theorem, this probability $P(s_n|f_i)$ is expressed by the following expression.

$$P(s_n | f_i) = \frac{P(f_i | s_n)P(s_n)}{P(f_i)} \quad (3)$$

The symbol $P(s_n)$ in the above expression (3) corresponds to the selection probability $\pi_n$. The probability $P(f_i)$ of the frequency $f_i$ appearing is calculated by the above expression (2). Therefore, the probability $P(s_n|f_i)$ that a structure corresponding to a frequency $f_i$ has a size $s_n$ is represented by the following expression, in which expression (2) is substituted into the denominator at the right side of expression (3) and $P(s_n)$ in the numerator at the right side of expression (3) is replaced with the selection probability $\pi_n$. The symbol $z_{in}$ in the following expression (4) corresponds to the probability $P(s_n|f_i)$ in expression (3).

$$z_{in} = \frac{\pi_n P(f_i | s_n)}{\sum_m \pi_m P(f_i | s_m)} \quad (4)$$

The selection probability $\pi_n$ is expressed by the following expression. In the following expression (5), $c_i$ and $c_j$ are predetermined constants.

$$\pi_n = \frac{\sum_j c_j z_{jn}}{\sum_{im} c_i z_{im}} \quad (5)$$

In an E step of the EM algorithm, the distribution generation section 104 calculates expected values of $z_{in}$ in expression (4). In an M step of the EM algorithm, the distribution generation section 104 calculates the selection probabilities $\pi_n$ in expression (5).

The distribution generation section 104 repeats the E step and M step of the EM algorithm until a predetermined convergence condition is satisfied. When the repeated computations converge, the distribution generation section 104 generates selection probabilities $\pi_n$ of sizes $s_n$ to serve as the size distribution of structures appearing in the contrast image. The selection probabilities $\pi_n$ correspond with probabilities $P(s_n)$ that represent degrees to which plural sizes $s_n$ (n=1 to N) are present. Therefore, the selection probabilities $\pi_n$ correspond to the size distribution of the plural sizes $s_n$ (n=1 to N).

A display section (not shown in the drawings) outputs a size distribution generated by the distribution generation section 104 as a result. A user of the information processing device 10 views the result of the size distribution displayed at the display section (not shown in the drawings).

Figure 8:
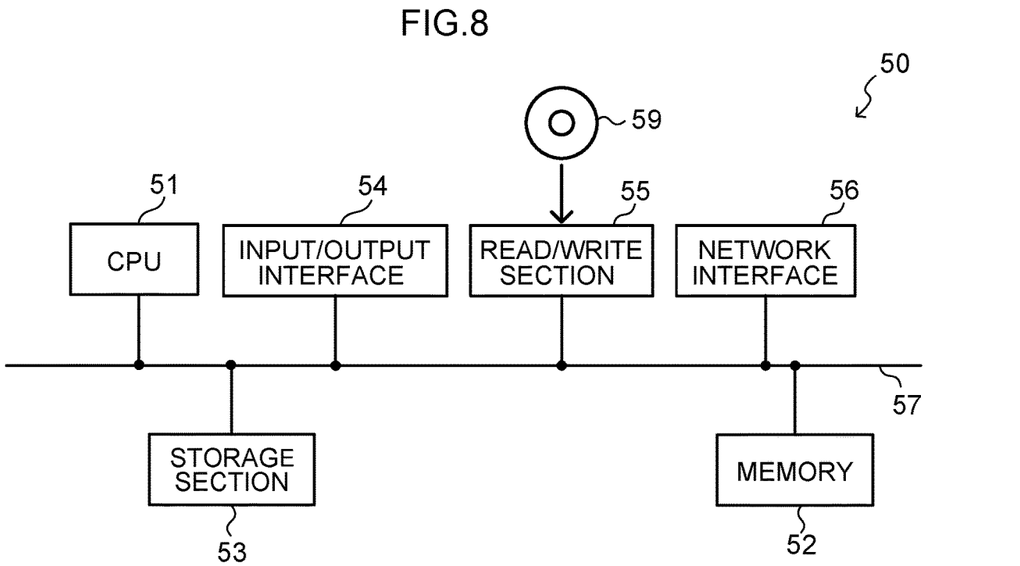
FIG. 8 is a diagram showing a structural example of a computer of an information processing device according to the exemplary embodiment.

The information processing device 10 may be realized by, for example, a computer 50 shown in FIG. 8. The computer 50 that realizes the information processing device 10 is provided with a CPU 51, a memory 52 that serves as a temporary storage area, and a memory section 53 that is nonvolatile. The computer is further provided with an input/output interface 54 that is connected to input/output devices and the like (not shown in the drawings) and with a read/write section 55 that controls reading and writing of data at a recording medium 59. The computer is also provided with a network interface 56 that is connected to a network such as the Internet or the like. The CPU 51, memory 52, memory section 53, input/output interface 54, read/write section 55 and network interface 56 are connected to one another via a bus 57.

The memory section 53 may be realized by a hard disk drive (HDD), solid state drive (SSD), flash memory or the like. A program causing the computer to function is stored at the memory section 53 that serves as a storage medium. The CPU 51 reads the program from the memory section 53 and loads the program into the memory 52, and successively executes processes included in the program.

Now, operation of the information processing device 10 according to the first exemplary embodiment is described.

Figure 9:
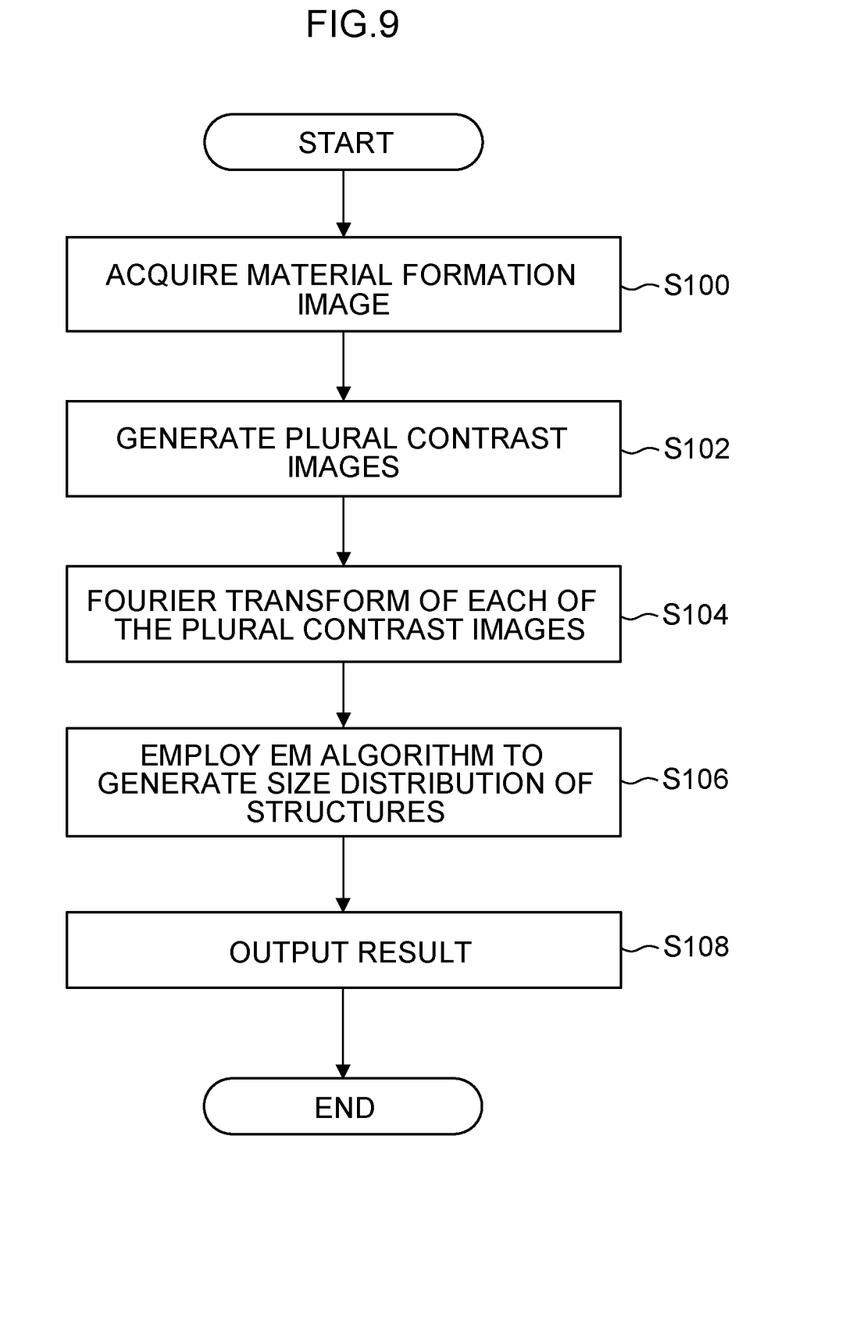
FIG. 9 is a flowchart showing an example of processing that is carried out at the information processing device according to the first exemplary embodiment.

When a material formation image is inputted into the information processing device 10, the information processing device 10 executes the information processing routine illustrated in FIG. 9.

In step S100 the acquisition section 100 acquires the inputted material formation image.

In step S102, on the basis of the material formation image acquired by the acquisition section 100, the image generation section 102 generates plural contrast images in which the material formation image is shaded in accordance with different levels of contrasts.

In step S104, by applying a Fourier transform to each of the plural contrast images generated by the image generation section 102, the distribution generation section 104 obtains Fourier transform results representing power spectra.

In step S106, on the basis of the respective Fourier transform results corresponding to the plural contrast images, the distribution generation section 104 employs the previously known EM algorithm to generate a size distribution of structures forming the material.

In step S108, the distribution generation section 104 outputs the size distribution obtained in step S106 as a result.

As described above, the information processing device 10 according to the first exemplary embodiment acquires a material formation image obtained by imaging a material. On the basis of the material formation image, the information processing device 10 generates contrast images which are plural material formation images with different levels of contrasts. Then, for each of the plural contrast images, the information processing device 10 estimates sizes of structures forming the material that appear in the contrast image and, on the basis of the estimated sizes of the structures, generates a size distribution of the structures forming the material. Thus, a size distribution of structures forming the material may be efficiently obtained from the formation image of the material. Because the contrast images are generated from the material formation image, size distributions of structures that appear only in the contrast images may be obtained.

Second Exemplary Embodiment

Now, a second exemplary embodiment is described. Portions of an image processing device according to the second exemplary embodiment that are the same as in the first exemplary embodiment are assigned the same reference symbols and are not described here. The information processing device according to the second exemplary embodiment does not generate plural contrast images corresponding to a material formation image but, from a grayscale material formation image, generates a size distribution of structures appearing in that image.

Figure 10:
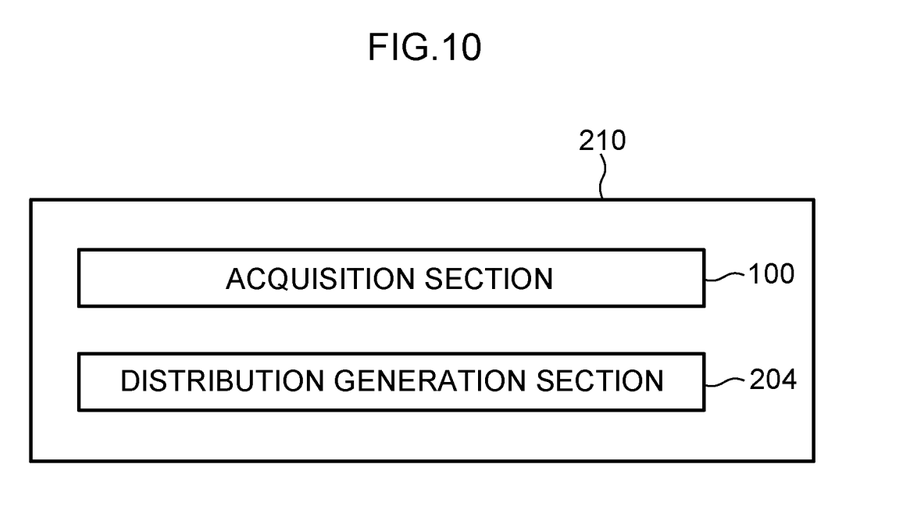
FIG. 10 is a schematic block diagram of an information processing device according to a second exemplary embodiment.

FIG. 10 is a block diagram showing an example of functional structures of an information processing device 210 according to the second exemplary embodiment. Functionally, as shown in FIG. 10, the information processing device 210 includes the acquisition section 100 and a distribution generation section 204.

A size distribution of structures appearing in a grayscale material formation image may be generated from the grayscale image without plural contrast images with different levels of contrasts being generated. Accordingly, the information processing device 210 according to the second exemplary embodiment does not generate plural contrast images corresponding to the material formation image but generates a size distribution of structures appearing in the grayscale material contrast image from that image.

By applying a Fourier transform to the material formation image acquired by the acquisition section 100, the distribution generation section 204 generates a Fourier transform result representing a power spectrum. Then, similarly to the first exemplary embodiment, on the basis of the Fourier transform result of the material formation image, the distribution generation section 204 employs the EM algorithm to generate a size distribution of structures forming the material.

Now, operation of the information processing device 210 according to the second exemplary embodiment is described.

Figure 11:
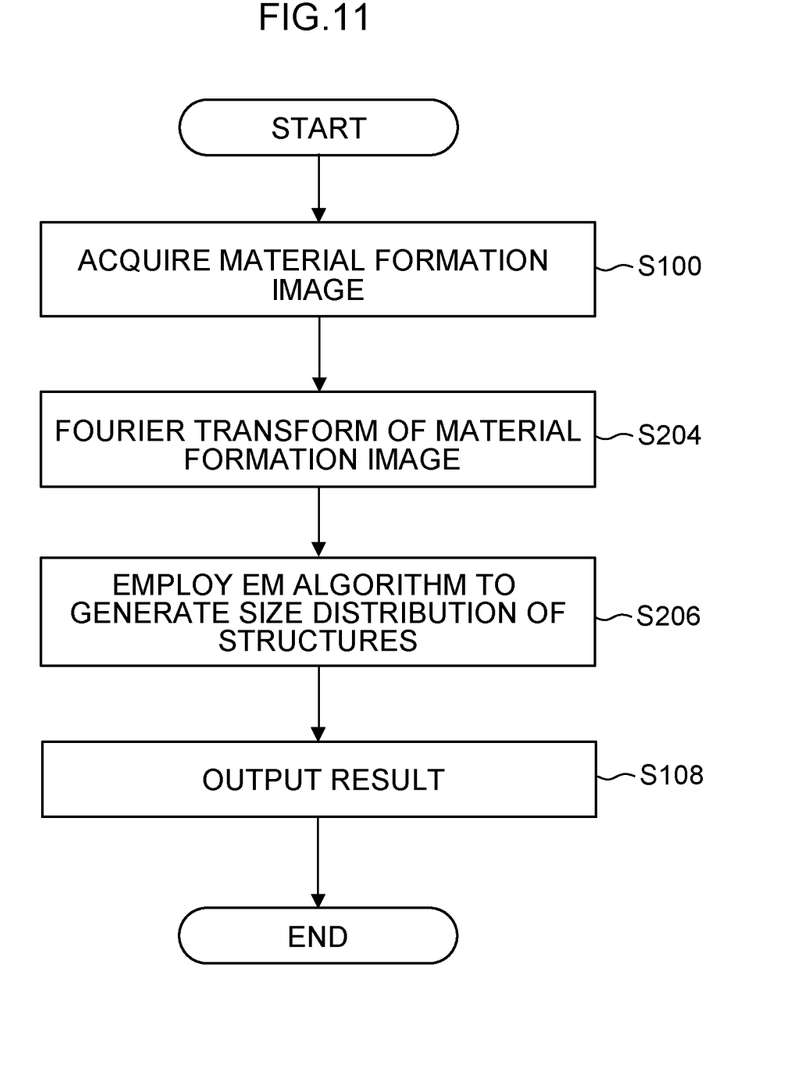
FIG. 11 is a flowchart showing an example of processing that is carried out at the information processing device according to the second exemplary embodiment.

When a material formation image is inputted into the information processing device 210, the information processing device 210 executes the information processing routine illustrated in FIG. 11.

In step S100, the acquisition section 100 acquires the inputted material formation image.

In step S204, by applying a Fourier transform to the material formation image acquired in step S100, the distribution generation section 204 obtains a Fourier transform result representing a power spectrum.

In step S206, similarly to the first exemplary embodiment, on the basis of the Fourier transform result obtained in step S204, the distribution generation section 204 employs the previously known EM algorithm to generate a size distribution of structures forming the material.

In step S108, the distribution generation section 204 outputs the size distribution obtained in step S206 as a result.

Other structures and operations of the information processing device according to the second exemplary embodiment are the same as in the first exemplary embodiment, so are not described here.

As described above, the information processing device according to the second exemplary embodiment generates a Fourier transform result representing a power spectrum by applying a Fourier transform to a material formation image and, on the basis of the Fourier transform result, employs the EM algorithm to generate a size distribution of structures forming the material. Thus, a size distribution of structures forming the material may be efficiently obtained from the formation image of the material. Furthermore, the size distribution of structures appearing in the grayscale material formation image may be generated from that image without plural contrast images with different levels of contrasts being generated.

The processing that is executed by the devices according to the exemplary embodiments described above is described as being software processing that is implemented by a program being executed, but the processing may be implemented in hardware. Alternatively, the processing may combine both software and hardware. Further, the program memorized in the memory section may be memorized in any of various memory media and distributed.

The present disclosure is not limited by the above recitations. In addition to the above recitations, it will be clear that numerous modifications may be embodied within a technical scope not departing from the gist of the disclosure.

For example, in the exemplary embodiments described above, grains, needles, fibers, holes or the like forming a material are mentioned as examples of structures forming the material, but different structures are also possible.

All publications, patent applications, and technical standards mentioned in this specification are herein incorporated by reference to the same extent as if each individual publication, patent application, or technical standard was specifically and individually indicated to be incorporated by reference.

What is claimed is:

1. An information processing device, comprising:
a memory; and
a processor connected to the memory, the processor being configured to:
acquire a material formation image representing a formation of a material, the material formation image being obtained by imaging the material;
generate a plurality of contrast images from the material formation image, the plurality of contrast images comprising a plurality of material formation images with different levels of contrast;
generate Fourier transform results representing a power spectrum by applying a Fourier transform to the acquired material formation image and applying a Fourier transform to each of the plurality of contrast images; and
employ an expectation-maximization algorithm to generate size distributions of structures forming the material based on the Fourier transform result of the material formation image and the Fourier transform result of the plurality of contrast images.

2. An information processing method, in which a processor executes processing comprising:
acquiring a material formation image representing a formation of a material, the material formation image being obtained by imaging the material;
generating a plurality of contrast images from the material formation image, the plurality of contrast images comprising a plurality of material formation images with different levels of contrast;
generating Fourier transform results representing a power spectrum by applying a Fourier transform to the acquired material formation image and applying a Fourier transform to each of the plurality of contrast images; and employing an expectation-maximization algorithm to generate size distributions of structures forming the material based on the Fourier transform result of the material formation image and the Fourier transform result of the plurality of contrast images.

3. A non-transitory computer readable storage medium storing an information processing program executable by a processor to perform processing comprising:

acquiring a material formation image representing a formation of a material, the material formation image being obtained by imaging the material;

generating a plurality of contrast images from the material formation image, the plurality of contrast images comprising a plurality of material formation images with different levels of contrast;

generating Fourier transform results representing a power spectrum by applying a Fourier transform to the acquired material formation image and applying a Fourier transform to each of the plurality of contrast images; and employing an expectation-maximization algorithm to generate size distributions of structures forming the material based on the Fourier transform result of the material formation image and the Fourier transform result of the plurality of contrast images.

* * * * *